United States Patent [19]

Roinestad et al.

[11] Patent Number: 4,951,807
[45] Date of Patent: Aug. 28, 1990

[54] NON-COLLAPSING INSIDE EDGE CONVEYOR BELT WITH DUAL PITCH LINKS

[75] Inventors: Gerald C. Roinestad; Michael R. Straight, both of Winchester, Va.

[73] Assignee: Ashworth Bros., Inc., Fall River, Mass.

[21] Appl. No.: 213,171

[22] Filed: Jun. 29, 1988

Related U.S. Application Data

[63] Continuation-in-part of Ser. No. 83,272, Aug. 10, 1987, abandoned, and a continuation-in-part of Ser. No. 171,390, Mar. 21, 1988, Pat. No. 4,867,301.

[51] Int. Cl.$^5$ .............................................. B65G 21/18
[52] U.S. Cl. .................... 198/778; 198/792; 198/852; 198/831
[58] Field of Search ......... 198/792, 778, 831, 851–853

[56] References Cited

U.S. PATENT DOCUMENTS

| Re. 27,690 | 7/1973 | Roinestad et al. | |
|---|---|---|---|
| 723,325 | 3/1903 | Souder . | |
| 792,623 | 6/1905 | Souder . | |
| 1,626,492 | 4/1927 | Youngson . | |
| 2,219,724 | 10/1940 | Quick . | |
| 2,278,361 | 3/1942 | Rapisarda . | |
| 2,706,033 | 4/1955 | Williams . | |
| 2,872,023 | 2/1959 | Bechtel, Jr. | 198/182 |
| 3,133,798 | 5/1964 | Feld et al. | 34/187 |
| 3,225,898 | 12/1965 | Roinestad . | |
| 3,261,451 | 7/1966 | Roinestad . | |
| 3,270,863 | 9/1966 | Ackles . | |

(List continued on next page.)

FOREIGN PATENT DOCUMENTS

| 293095 | 11/1988 | European Pat. Off. . |
|---|---|---|
| 34766 | 11/1964 | German Democratic Rep. . |
| 830287 | 3/1960 | United Kingdom . |
| 1090630 | 11/1967 | United Kingdom . |
| 1301655 | 1/1973 | United Kingdom . |
| 1330282 | 9/1973 | United Kingdom . |
| 1575729 | 9/1980 | United Kingdom . |
| 2072123A | 9/1981 | United Kingdom . |
| 2505545 | 12/1988 | United Kingdom . |

OTHER PUBLICATIONS

Frigoscandia's Frigobelt and Gyrofreeze C Brochure.
Allied–Locke Industries, Inc. Catalog No. 882 Literature.
Power Transmission Design, p. 104, 6/88.
Exhibit B: European Search Report (Corresponding European Patent Application No. EP 8830784.3).
Exhibit C: Ashworth Small Radius ® and Omni–Grid Belt Brochure, 8/83.

*Primary Examiner*—Joseph E. Valenza
*Attorney, Agent, or Firm*—Banner, Birch, McKie & Beckett

[57] ABSTRACT

A conveyor belt designed to operate about lateral curves is disclosed. The conveyor belt is comprised of transverse rods interconnected by links disposed along opposite transverse edges of the belt. The links along at least one transverse edge are dual pitch links. The links along the other transverse edge are preferably U-shaped single pitch links for connecting adjacent rods. When the belt proceeds about a lateral curve, the pitch along the inside edge of the curve is held the same as in straight line motion, while the outside edge of the belt is expanded to a second greater pitch by pivoting motion of the dual pitch links. In one embodiment single pitch links and support links are disposed along the inside edge of the belt to provide support for the inside edge of successive tiers of the belt as the belt travels a helical path. A specific link construction which uses a work-hardened curved bearing surface is also disclosed. Finally, a relationship for correlating the end most surfaces of the apertures or slots in the single and dual pitch links is disclosed so that inner ends of the rods remain at a non-collapsing single pitch and the outside ends of the rods can move to a second greater pitch.

60 Claims, 8 Drawing Sheets

U.S. PATENT DOCUMENTS

| | | | |
|---|---|---|---|
| 3,315,492 | 4/1967 | Dreksler . | |
| 3,319,778 | 5/1967 | Bessant . | |
| 3,348,659 | 10/1967 | Roinestad . | |
| 3,439,795 | 4/1969 | Roinestad et al. | 198/193 |
| 3,467,239 | 9/1969 | Roinestad | 198/195 |
| 3,659,697 | 5/1972 | Brackmann et al. . | |
| 3,664,487 | 5/1972 | Ballenger . | |
| 3,733,848 | 5/1973 | Duron et al. | 62/381 |
| 3,750,859 | 8/1973 | Smith . | |
| 3,920,117 | 11/1975 | Roinestad . | |
| 3,938,651 | 2/1976 | Alfred . | |
| 4,023,381 | 5/1977 | Onodera | 62/381 |
| 4,036,352 | 7/1977 | White . | |
| 4,078,655 | 3/1978 | Roinestad . | |
| 4,103,768 | 8/1978 | Persson | 198/778 |
| 4,118,181 | 10/1978 | Onodera . | |
| 4,222,483 | 9/1980 | Wootton et al. . | |
| 4,260,053 | 4/1981 | Onodera | 198/831 |
| 4,333,318 | 6/1982 | Tyree, Jr. | 62/374 |
| 4,440,367 | 4/1984 | Daringer . | |
| 4,448,301 | 5/1984 | Alger . | |
| 4,450,953 | 5/1984 | Le Cann et al. . | |
| 4,557,374 | 12/1985 | Bode . | |
| 4,565,282 | 1/1986 | Olsson et al. . | |
| 4,603,776 | 8/1986 | Olsson . | |
| 4,662,509 | 5/1987 | Kaak . | |
| 4,741,430 | 5/1988 | Roinestad . | |
| 4,858,750 | 8/1989 | Cawley | 198/778 |
| 4,875,343 | 10/1989 | Jeppsson | 62/381 |
| 4,878,362 | 11/1989 | Tyree, Jr. | 62/381 |

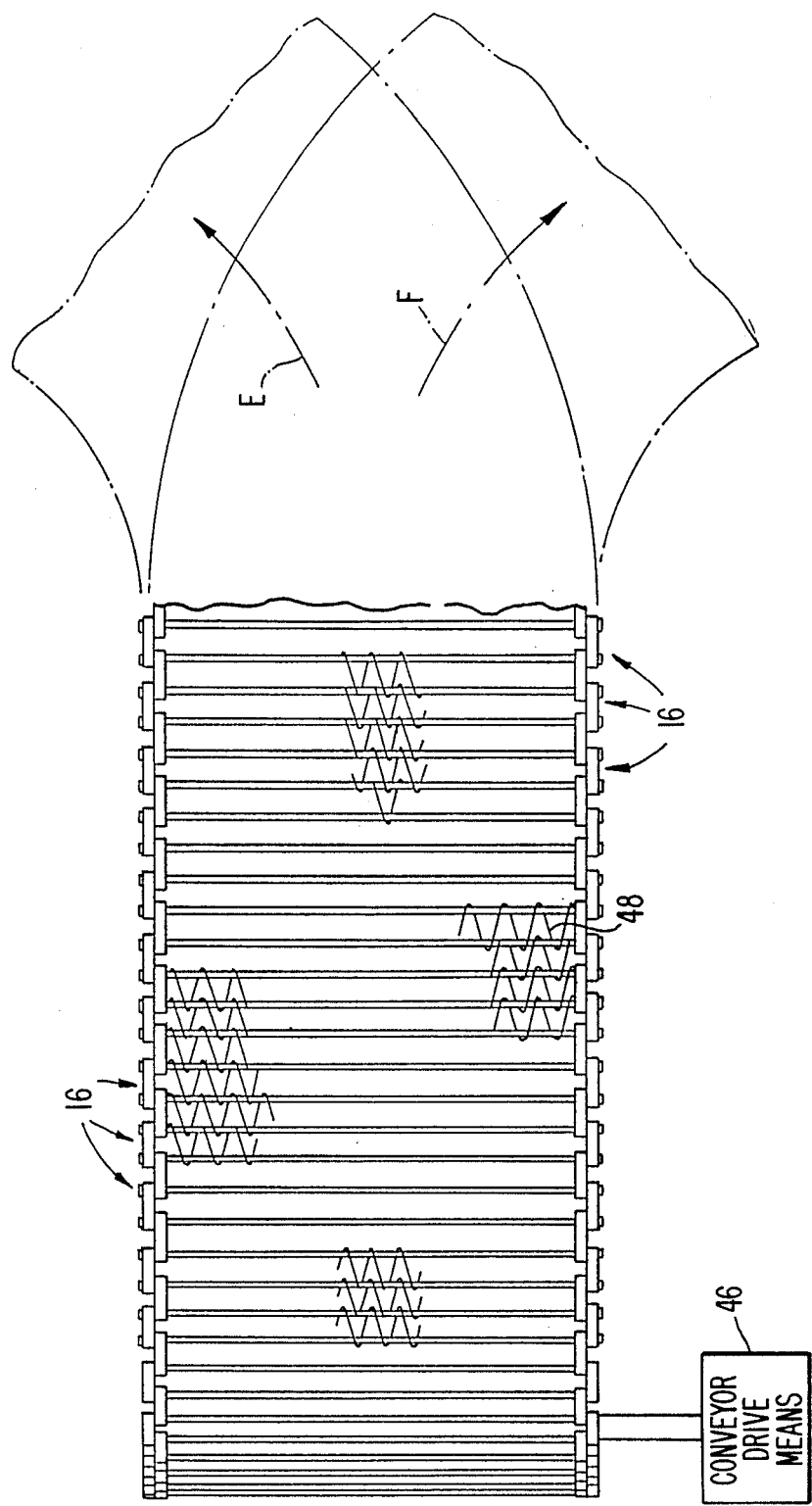

NON-COLLAPSING INSIDE EDGE CONVEYOR BELT WITH DUAL PITCH LINKS

RELATED APPLICATION

This application is a continuation-in-part of application Ser. No. 083,272, filed on Aug. 10, 1987, abandoned, and a continuation-in-part of application Ser. No. 171,390, filed on Mar. 21, 1988, U.S. Pat. No. 4,867,301, which in turn is a continuation-in-part of application Ser. No. 083,272, filed on Aug. 10, 1987, abandoned.

TECHNICAL FIELD

This invention relates to a conveyor belt designed to travel about lateral curves. More specifically, the invention concerns a conveyor belt which includes transverse rods connected by links disposed along the opposite transverse ends of the rods, wherein the links along at least one edge of the belt are dual pitch links pivotable between positions wherein the ends of the rods are moved between a first pitch and a second larger pitch.

BACKGROUND OF THE INVENTION

Conveyor belts comprised of transverse rods connected by links disposed along the opposite transverse edges of the belt have been in use for a long period of time. One such prior art belt uses generally U-shaped nestable links with slotted holes that allow the links to slide on the rods. The relative sliding action between the links and rods provides lateral flexibility which enables the belt to turn right or left, when such nestable links are used on both sides of the belt. When such a belt proceeds around a lateral curve, the rod ends along the inside concave edge of the belt collapse. The opposite transverse ends of the rods along the outside convex edge of the belt either remain at the same pitch as when the belt travels in a straight line direction, such as disclosed in U.S. Pat. No. 3,225,898 to Roinestad, or expand to a greater pitch in order to allow the belt to proceed around a smaller radius, as disclosed in U.S. Pat. No. 4,078,655 to Roinestad.

The collapsing or diminishing pitch of the belt along the inside edge of a lateral curve creates several problems. First of all, most ware is charged into a conveying system in a rank and file arrangement, and spacing of the ranks (crosswise rows) can only be controlled by adjusting the relative speeds of the individual feed conveyors. To make certain that the ware does not overlap, it is necessary to take into account the collapsing pitch and to also leave a safety margin in the spacing, both of which result in a drop in efficiency. If the ware being conveyed is soft in nature, the collapsing pitch can result in wrinkling of the ware. Also, if the conveyor is used in a freezing plant, the collapsing pitch can result in contact and freezing together of adjacent ware if sufficient spacing is not used.

U.S. Pat. No. 4,662,509 issued to Kaak on May 5, 1987, addresses the problem of a conveyor belt having a collapsing inner edge in a chain type conveyor belt wherein the ware support carriers are connected directly to a drive chain. The chain conveyor belt in the '509 patent uses triangular carriers consisting of a rod-shaped element and a pulling element. Along the inside edge of the conveyor belt, the rod-shaped element and the pulling element are pivotably connected to the drive chain, and the pitch of the rod-shaped elements is held constant by the connection to the drive chain. The pulling elements slant backward in the direction of travel of the belt and are pivotably connected to one of the rod-shaped elements further rearward along the belt. As the belt proceeds around a curve, the outside, free ends of the rod-shaped elements increase their spacing or pitch with respect to one another.

The conveyor belt disclosed in the '509 patent, however, has certain disadvantages or limitations. The triangular configuration of the ware carriers precludes negotiation about end pulleys or rolls, or operating through a vertical hanging take-up mechanism. The practical width of the ware carriers is limited by the triangular configuration, because the effectiveness of the pulling element diminishes with increasing width. Finally, the overlapping orientation of the pulling and rod-shaped elements gives rise to serious sanitation difficulties. The capability to clean between all elements of a belt is important when the conveyor belt is used in a food handling environment.

Prior art helical tier systems, such as disclosed in U.S. Pat. Nos. 3,348,659 and 4,078,655 to Gerald C. Roinestad have used conveying belts with a collapsing inner edge. The successive tiers of belt in the '659 and '655 patents are supported by a support frame separate from the belt. The minimum tier height in such a system is equal to the sum of the heights of the separate belt support frame, the ware being conveyed and the belt, resulting in a system with a relatively large vertical extent. U.S. Pat. No. 3,938,651 to Alfred et al. discloses a conveying system for conveying in a helical path wherein the belt is self-supporting along both the inner and outer edges of the belt.

Another aspect of the invention is directed to the construction of the U-shaped links, particularly the construction of the portion connecting the legs of the link. It has been known in the prior art to curve the bearing surface of the connecting portion of U-shaped links. For example, the bearing surface of certain pintle chain links manufactured by the Allied-Locke Industries, Incorporated are curved. However, such prior art curved bearing surfaces for tractive links do not substantially increase the wear characteristics of the links in the manner of the present invention.

SUMMARY OF THE INVENTION

The present invention is directed to a conveyor belt for conveying in both a straight line direction and around lateral curves.

The conveyor belt of the present invention is comprised of a plurality of rods and a mechanism for connecting the rods to form a length of belt. Each rod extends transversely of the length of the belt between an inside end along the inside edge of the lateral curves and an outside end along the outside edge of the lateral curves. The rods are arranged adjacent one another along the length of the belt. The connecting structure includes at least one link mechanism disposed adjacent the inside and outside ends of the rods for coupling adjacent pairs of rods to one another. The link mechanism also keeps the inside and outside ends of each of the rods at a substantially same first pitch during straight line motion of the belt. During motion of the belt about a lateral curve, the link mechanism keeps the inside ends of each of the rods at the first pitch along the transverse ends of the rods located at the inside concave edge of the lateral curve, moves the opposite transverse ends of each of the rods to a second greater pitch along the outside convex edge of the lateral curve as the belt proceeds from straight line to lateral curved motion, and returns the opposite transverse ends of each of the rods to the first pitch as the belt moves from lateral curved to straight line motion.

The conveyor belt can be adapted to travel around lateral curves in a single direction or around lateral curves in both the right and left directions. When the belt is designed to travel around lateral curves in a single direction, the link mechanism includes both single pitch links and dual pitch links. However, when the belt is designed to travel around lateral curves in both the left and right directions, dual pitch links are disposed along both edges of the belt. The dual pitch links are capable of pivoting motion between a first position and a second position. In the first position the transverse ends of the rods connected by the respective links are held at the first pitch, and, in the second position one transverse end of adjacent rods are disposed at the second pitch.

Each dual pitch link can include a body which has a pivot aperture about which the dual pitch links can pivot and a pitch changing slot. The transverse end of one of the rods is received in the pivot aperture and the transverse end of an adjacent one of the rods is slidably received in the pitch changing slot. A cam mechanism or the like can be provided for pivoting the dual pitch links between their first and second positions during motion around lateral curves.

The present invention can also have at least one support link joining pairs of adjacent rods. Each support link can include a longitudinal portion extending both longitudinally between a pair of adjacent rods and vertically away from the rods, and at least one tab portion extending transversely from the longitudinal portion. Holes are formed in each longitudinal portion to couple the support links to adjacent pairs of rods. The tab portions are spaced a predetermined vertical distance from the rods to contact an inside edge of an adjacent vertically spaced tier of the belt and, thereby, support the inside edge of the superimposed tiers when the belt is arranged to travel along a helical conveying path.

A further aspect of the present invention is directed to the construction of the single pitch links in a manner to substantially increase their wear characteristics. According to this aspect of the invention, a single pitch link can include a substantially flat piece of metal which is formed into a general U-shape with a pair of spaced leg portions joined by a connecting portion. The substantially flat piece of metal has a reduced thickness area in the connecting portion formed of a compressed, work-hardened area of the metal. The work-hardened area of the connecting portion forms a curved bearing surface against which a rod can bear.

In an embodiment including both single pitch links and dual pitch links, the lateral curves can have a predetermined maximum curvature with a predetermined radius of curvature. This link mechanism includes, along the inside concave edge of the belt, a plurality of separate single pitch links joining each pair of adjacent rods and, along the outside convex edge of the belt, at least one dual pitch link joining each pair of adjacent rods. Each of the single pitch links can include holes having end surfaces spaced a first predetermined distance such that a plurality of the single pitch links joining adjacent rods align the adjacent rods in a generally parallel relation at the first pitch when the belt is under tractive load in straight line conveying motion.

In a preferred embodiment, the single pitch links can include at least two generally U-shaped links joining adjacent inside pairs of the rods. Each of the single pitch U-shaped links has a pair of spaced leg portions extending generally in the lenghtwise direction of the belt and a connecting portion joining the spaced leg portions. Each of the leg portions have holes formed through them for the passage of an adjacent pair of rods. The holes in the U-shaped links have end surfaces with a predetermined first longitudinal spacing between the hole end surfaces.

The above mentioned dual pitch link pitch changing slot has a first pitch area where the outside end of one of said rods is received when the rods are spaced by the first pitch amount and a second pitch area where the outside end of this same rod is received when the rods are spaced by a second pitch amount. The pivot apertures and the pitch changing slot second pitch area each have an end surface with a second greater predetermined longitudinal spacing between the pivot aperture and the pitch changing slot second pitch area end surfaces.

The first longitudinal spacing is correlated to the second longitudinal spacing and to the predetermined radius of curvature so that in straight line conveying motion the inside ends of the rods are kept at the first pitch and the inside U-shaped links are tractive while the outside dual pitch links are non-tractive, and during lateral curved conveying motion the inside ends of the rods are kept at substantially the first pitch and at least one of the inside U-shaped links remains tractive while the outside ends of the rods move to the second greater pitch.

The correlation of the longitudinal spacing of the end surfaces is preferably set so that the outside ends of the rods contact the opposing end surfaces of the pivot apertures and the pitch changing slot second pitch areas in the dual pitch links when the belt travels around a lateral curve of the predetermined maximum curvature with the dual pitch links assuming only a minimal amount of tractive load. Such a correlation assures that at least one of the single pitch links remains tractive and that the inside ends of the rods remain at substantially the first pitch.

It has been discovered that the use of a link mechanism which keeps the inside rod ends at a constant pitch along the inner concave edge of a belt with dual pitch links along the outer convex edge of a belt is particularly suitable for use in a conveying system wherein the belt travels along a helical path with the belt being arranged in a number of superimposed helically extending tiers. In such a curved tier system, less amount of belt is necessary to accommodate the same amount of an offloading surface.

Further, the use of the correlated spacing with the single and dual pitch links is particularly advantageous in a helical tiered conveying system wherein the curvature in the helix is the maximum curvature of the system. The belt can then be readily adapted to the system so that a non-collapsing inside edge is assured throughout the tiers of the system, while the outside edge of the belt moving through the tiers is stabilized by the contact of the rods with the end surfaces of the pivot apertures and pitch changing slots in the dual pitch links.

An advantage of belts which have a constant non-collapsing inside pitch in such stacked tier systems is that a significantly less amount of belt is required for a given helical path over the amount of belt which is needed using prior art belts with a collapsing inside edge. The use of a non-collapsing pitch in combination with a drive drum and support links along the inside edge of the belt is particularly advantageous, because localized shifting of the inside edge of the belt as it moves through the helical path is greatly minimized.

In the system of the present invention the ware can be loaded as closely as possible, so that for a given ware capacity, the belt can be driven at a lower speed, thereby increasing the life of the belt. Also, the rod-link arrangement of the present invention allows the belt to be used in normal charge and discharge operations, and about end pulleys, rolls and take-up mechanisms. Also, for a given inside radius of a lateral curve about which the belt travels, the tension on a belt of the present invention in a spiral or curved tier system would be less than with conventional rod-link belts.

The use of support links in combination with constant single pitch U-shaped inside links and dual pitch outside links also results in significant advantages. The support links allow for a significant reduction in height of the external belt support, while maintaining compatibility with sprockets and allowing the belt to proceed about comparatively tight bends around rolls, pulleys, etc. Furthermore, these advantages are attained without the disadvantages of the collapsing inner belt edge, such as lower efficiency, wrinkling of ware or freezing together of adjacent ware. A smoother transition from straight line conveying into helical, stacked tier conveying also results from preventing the collapse of the inner edge of the belt by the substantially constant single pitch U-shaped inside links.

Finally, the use of inside single pitch links having work-hardened bearing surfaces greatly enhances the wear characteristics of the single pitch links. The work-hardened, curved inner bearing surface of the connecting portion of the links reduces wear elongation of the links in two ways. First, by increasing the area of contact, the same volume of wear would represent a smaller elongation of the link pitch. Secondly, by forming the curved surface through a coining process which reduces the thickness of the connecting portion from a relatively large thickness to a smaller thickness, the connecting portion becomes a work-hardened, wear resistant section of material. Prevention of wear elongation of single pitch links is particularly important for the belt of the present invention wherein the belt and conveyor system are designed so that the single pitch links remain tractive in both straight line and lateral curved motion, and, as the belt is frequently used in environments where sanitation is important, undesirable wear debris can be diminished.

Further objects, features and other aspects of this invention will be understood from the following detailed description of the preferred embodiment of this invention referring to the annexed drawings.

BRIEF DESCRIPTION OF THE DRAWINGS

FIG. 21 is a schematic top plan view illustrating a conveyor belt designed to travel in both lateral directions with dual pitch links on both transverse edges of the belt.

DETAILED DESCRIPTION OF THE INVENTION

Figure 1:
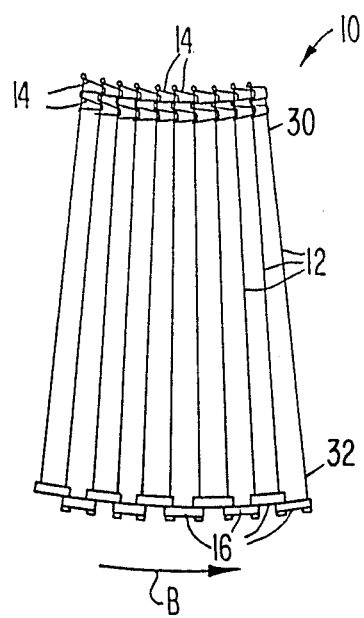
FIG. 1 is a schematic plan view of a portion of a conveyor belt in accordance with the present invention, illustrating the belt passing around a lateral curve.
Figure 2:
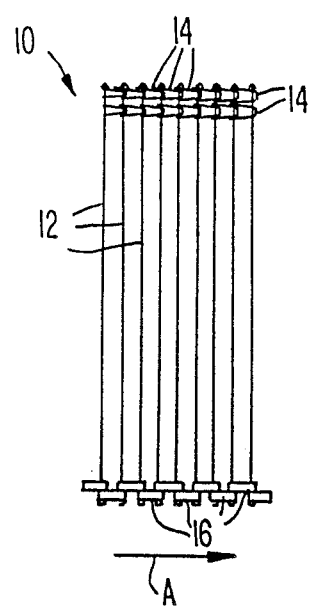
FIG. 2 is a schematic plan view of the conveyor belt of FIG. 1, illustrating the belt traveling in a straight line direction.
Figure 3:
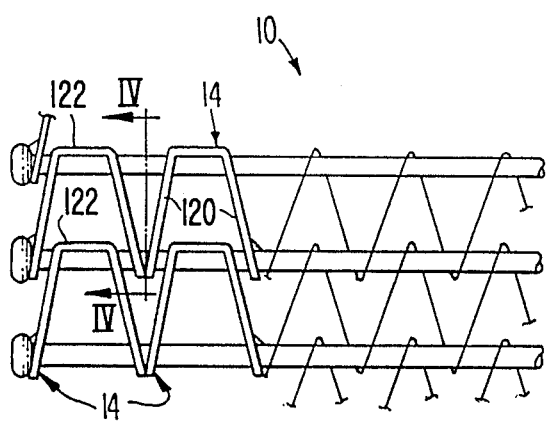
FIG. 3 is a plan view of an inside portion of the conveyor belt in accordance with an embodiment of the present invention.

Referring to the Figures wherein like numerals indicate like elements, a portion of a conveyor belt 10 is shown in FIGS. 1 and 2. FIG. 3 illustrates the left or inside concave edge of belt 10. Conveyor belt 10 is formed of a plurality of rods 12, single pitch links 14 along one edge of belt 10 and dual pitch links 16 along the opposite edge of belt 10. Rods 12 extend transversely of the length of belt 10 and they have enlarged or upset ends. Links 14 and 16 couple adjacent rods 12 to one another to form a length of belt 10.

Single pitch links 14 can be conventional U-shaped links having apertures for receiving the inside ends of a pair of rods 12. The apertures in links 14 are slightly oversized with respect to the cross-sectional dimension of rods 12 to permit cleaning, nevertheless, links 14 hold the ends of rods 12 to substantially a constant or single pitch.

Links 16 are dual pitch links designed to change the pitch of rods 12 (spacing between adjacent rods 12) along the edge at which they are disposed between a first pitch and a second greater pitch. The first pitch is substantially equal to the pitch at which links 14 hold the inside ends of rods 12 during straight line motion as shown in FIG. 2. When belt 10 proceeds around a lateral curve, as shown in FIG. 1, dual pitch links 16 move the outside ends of the rods to which they are coupled to the second greater pitch along the outside convex edge 32 of the lateral curve, while links 14 hold the inside ends of the rods to which they are attached to the first pitch along the inside concave edge 30 of the lateral curve.

Figure 4:
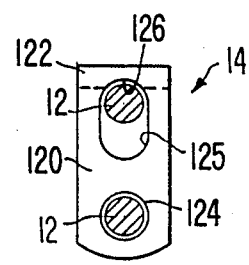
FIG. 4 is a sectional view taken generally along line IV—IV of FIG. 3.

As shown in FIGS. 3 and 4, U-shaped links 14 have leg portions 120 which extend generally in the lengthwise direction of belt 10, and connecting portions 122 which join leg portions 120. Leg portions 120 have a pair of spaced holes 124, 125 for receiving the inside ends of a pair of rods 12. Holes 124, at the trailing end of link 14, are slightly oversized with respect to the cross-sectional dimension of rod 12 to permit cleaning of the belt. Holes 125, at the leading end of links 14, are in the form of a slot of oversized width, likewise for the purpose of permitting cleaning. Holes 124 and 125 are located and shaped so that the inside ends of rods 12 are kept at a first pitch (center to center spacing between adjacent rods 12) when the belt is under tractive load. Also, links 14 and rods 12, which are approximately along the inside concave edge of belt 10, remain under tractive load both during straight line motion and lateral curved motion. As will be explained, the inside portions of rods 12 are kept at substantially the first pitch and under tractive load in both straight line motion and lateral curved motion of belt 10 by the specific design of the combination of single pitch links 14 and dual pitch links 16, which form a link mechanism for belt 10.

Figure 5:
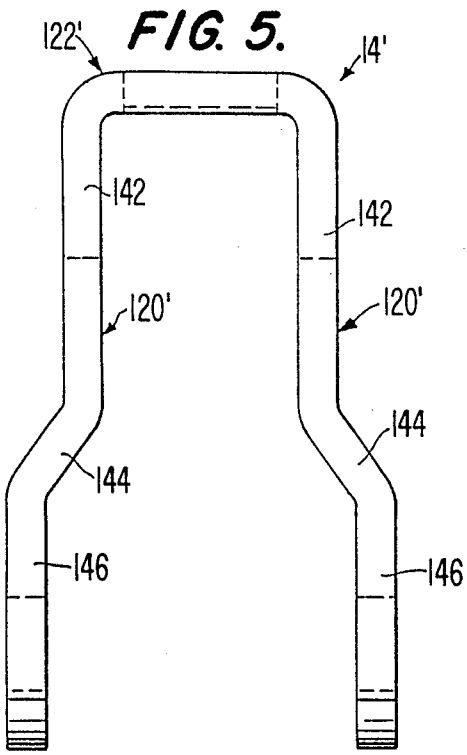
FIG. 5 is a plan view of an improved U-shaped link having a work-hardened, curved bearing surface and modified leg portions.
Figure 6:
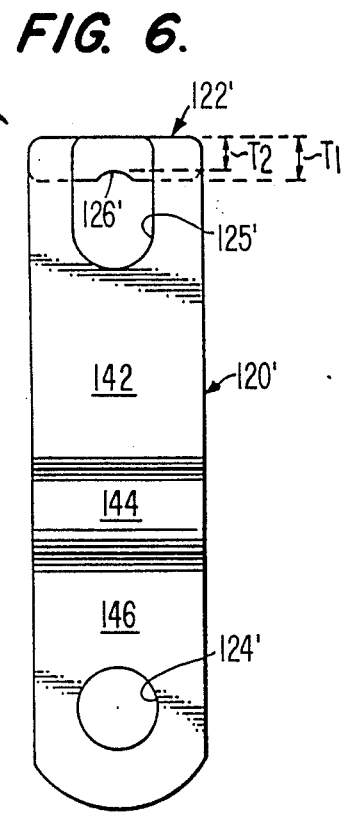
FIG. 6 is a side view of the link illustrated in FIG. 5.

U-shaped single pitch link 14 leg portions 120 can be substantially straight and diverge outwardly from opposite ends of connecting portion 122. Alternatively, the inside links can be configured as the U-shaped links 14' illustrated in FIGS. 5 and 6. Link 14' has a connecting portion 122' similar to connecting portion 122, however, leg portions 120' are formed different from leg portions 120. Each leg portion 120' includes an inner section 142 extending generally perpendicularly from connecting portion 122', a middle section 144 diverging outwardly from inner section 142, and an outer or end section 146 extending from middle section 144 in a direction generally parallel to inner section 142.

Each link 14, 14' can be formed of a substantially flat piece of metal. The flat piece of metal has a first thickness $T_1$ along the top and bottom areas of connecting portions 122, 122' and along leg portions 120, 120'. A curved bearing surface 126, 126' is formed in the inner surface of connecting portions 122, 122', while the outer surface remains substantially flat. Bearing surface 126, 126' is formed by a coining process wherein the material of connecting portions 122, 122' is compressed to a maximum reduced thickness $T_2$. The compressed, reduced thickness area, thus, becomes a work-hardened area of connecting portions 122, 122'. The maximum reduced thickness $T_2$ is at least 90% of thickness $T_1$ and not less than preferably 70%. A typical example being $T_1$ of 0.105 inch reduced to $T_2$ of 0.80 inch. The curved bearing surface substantially mates with the outer surface of rod 12, i.e. has substantially the same radius of curvature. Links 16 can also include a work-hardened bearing surface. However, this is not necessary since links 16 are designed not to take any significant tractive load.

Figure 7:
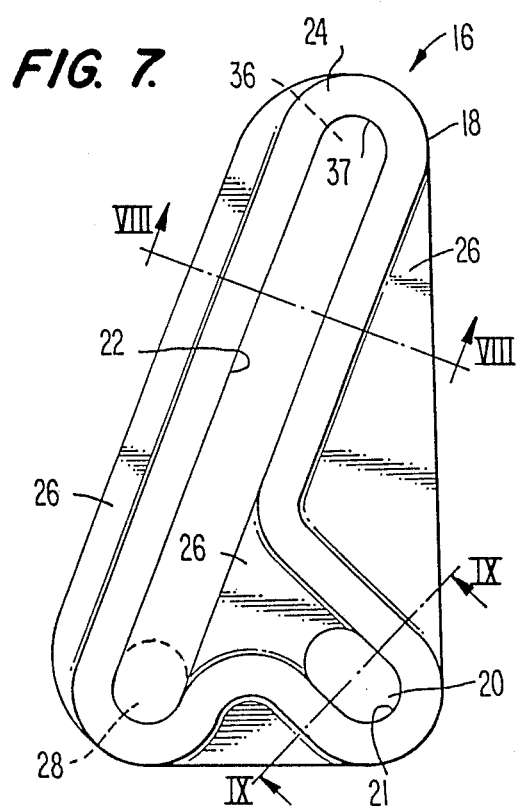
FIG. 7 is a side view of a dual pitch link in accordance with the present invention.
Figure 8:
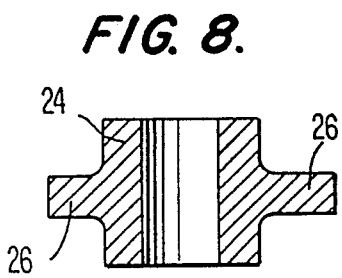
FIG. 8 is a sectional view taken generally along the line VIII—VIII of FIG. 7.
Figure 9:
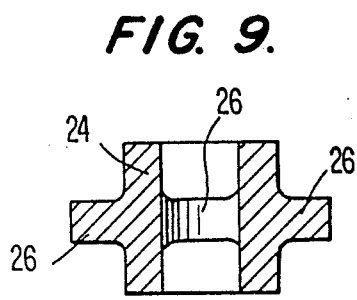
FIG. 9 is a sectional view taken generally along line IX—IX of FIG. 7.

FIG. 7 illustrates the structural details of one embodiment of a dual pitch link 16. Link 16 is preferably formed as a single integral body 18 which has a generally triangular shape or perimeter. A pivot aperture 20 and an elongate pitch changing slot 22 are formed through body 18 of dual pitch link 16. As further illustrated in FIGS. 8 and 9, body 18 can be formed of two thicknesses of material, i.e., a thick portion 24 extending around a substantial portion of aperture 20 and slot 22, and a thinner web portion 26 filling in and extending around the border of thicker portion 24. A two thickness configuration of body 18 is particularly suitable for a body 18 formed of a molded plastic material wherein a sturdy border is provided for aperture 20 and slot 22, while the thinner web portions 26 form an easy to handle, structurally sound and material saving configuration for the integral body 18.

Figure 10:
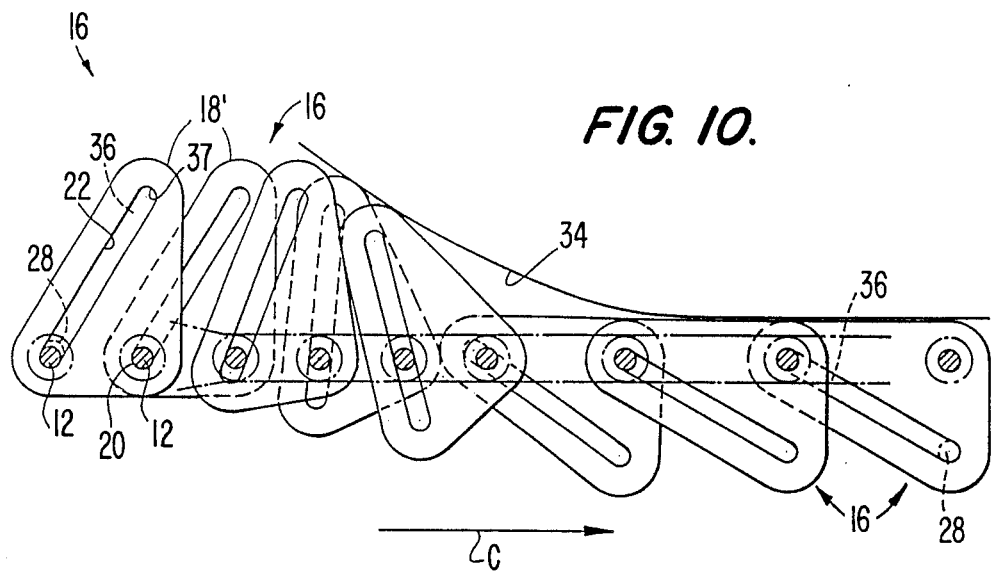
FIG. 10 is a schematic side view, illustrating another embodiment of dual pitch links pivoting from a first pitch to a second greater pitch.
Figure 11:
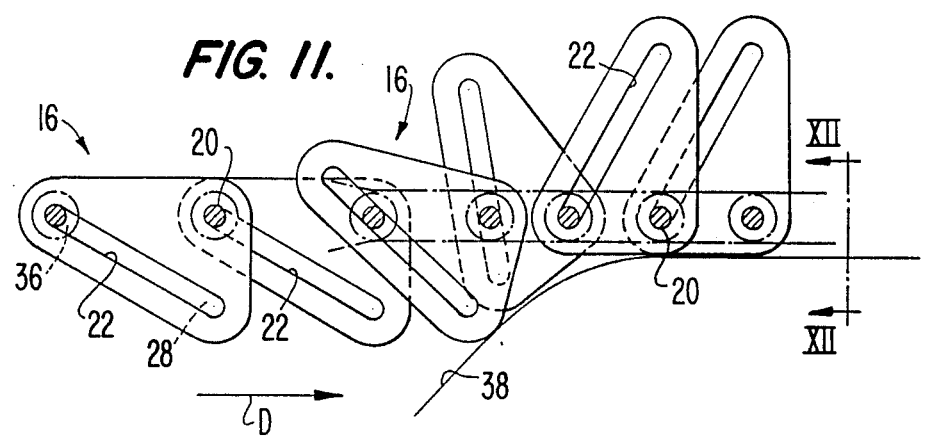
FIG. 11 is a schematic side view similar to FIG. 10, illustrating the dual pitch links pivoting from the second greater pitch to the first shorter pitch.

FIGS. 10 and 11 illustrate an alternate, simplified configuration for the body of dual pitch links 16, identified as body 18'. As seen therein, body 18' is formed of a flat piece of material containing aperture 20 and slot 22. The shape of body 18' is particularly suitable for links 16 made from machined metal.

Referring to FIGS. 1, 2, 10 and 11, an operation of belt 10 will be explained. FIG. 2 illustrates belt 10 proceeding in a straight line direction indicated by arrow A. As seen therein, the pitch is the same at both edges of belt 10. Links 14 are single pitch links which hold adjacent rods at this constant pitch. The position of adjacent rods in straight line conveying is illustrated in FIG. 10 by the left-most pair of rods 12, and the three right-most rods in FIG. 11. Referring to FIG. 10, a first rod 12 is received in pivot aperture 20 of the left-most dual pitch link 16 and an adjacent rod 12 is received in pitch changing slot 22 of this link 16. The last-mentioned rod 12 is located in a first pitch area 28 of slot 22 which is located adjacent rods 12 at substantially the same pitch as links 14 locate the adjacent rods. This pitch is the shortest pitch allowed by link 16. In this condition, tractive load can be shared between the U-shaped single pitch links 14 and the dual pitch links 16. Links 14 and 16 can be dimensioned, however, so that the relative amounts of tractive load can be shared unevenly. For example, when dual pitch links 16 are formed of a plastic material, it is desirable to have single pitch links 14, which are generally formed of metal, carry more of the tractive load.

The orientation of rods 12, when belt 10 proceeds around a lateral curve, as shown by arrow B, is illustrated in FIG. 1. As seen therein, the inside concave edge 30 of belt 10 remains at the same first pitch as in straight line motion, while the outside convex edge 32 of belt 10 has been moved to a greater pitch by dual pitch links 16. FIG. 10 illustrates the pivoting motion of links 16 that moves the outside ends of rods 12 along the outside edge 32 to the second greater pitch. As seen therein, a cam surface or the like 34 for pivoting the dual pitch links is located adjacent outside edge 32 of belt 10 in alignment with links 16. As belt 10 proceeds in the direction of arrow C, an upper edge of links 16 contacts cam surface 34 which causes links 16 to pivot in a counterclockwise direction. The pivoting motion of links 16 causes the ends of rods 12 received in the pitch changing slot 22 to slide from the first pitch area 28, wherein adjacent rods 12 are close to one another, to a second pitch area 36 where the spacing between adjacent rods 12 is greater. The pitch changing slot second pitch area forwardmost end surface is 37. See also, FIG. 7. As seen in FIG. 10, cam surface 34 can cause link 16 to pivot 90° and locate rod 12 carried in slot 22 at the furthest end of slot 22 to contact the second pitch area 36 end surface 37. The length and orientation of pitch changing slot 22 is selected to accommodate the greatest pitch along outside curve edge 32 for a given system. Of course, if smaller pitches are required within the same system, cam surface 34 can be designed to pivot dual pitch links 16 to a lesser degree, thereby locating the end of rod 12 received in slot 22 within an intermediate position in second pitch area 36.

FIG. 11 illustrates the manner in which links 16 are pivoted to return rods 12 from the second pitch used in lateral curved motion to the first pitch used in straight line conveying. As shown therein, belt 10 proceeds in the direction of arrow D and links 16 contact a cam surface or the like 38, which pivots links 16 in a clockwise direction. The clockwise pivoting motion of links 16 moves the ends of transverse rods 12 from the second pitch area 36 to the first pitch area 28 of pitch changing slots 22.

Figure 12:
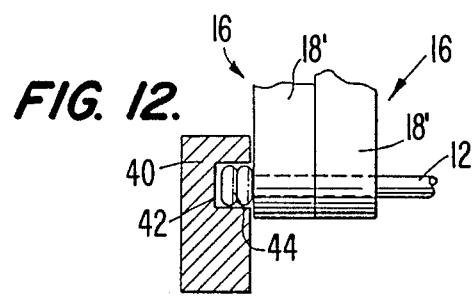
FIG. 12 is an end view, partially in section, illustrating a guide track for receiving a rod end.

As seen in FIG. 12, an elongate guide block 40, having a guide slot 42, can be located adjacent the belt outer edge 32 in the transition area where cam surfaces 34 and 38 cause pivoting motion of links 16. The outermost end of rods 12 are carried within guide slot 42 to keep the ends of rods 12 within the plane of conveying motion of belt 10 during pivoting of links 16. As further seen in FIG. 12, the ends of rods 12 received within slot 42 preferably have a double struck upset head, which assures that the end of transverse rod 12 remains within guide slot 42 even after wear occurs. Guide slot 42 can be eliminated at curves where smooth travel of the belt is not required, for example, on return portions of the conveyor where no ware is being transported, or on a loaded portion of the conveyor if a slight momentary humping of the conveyor surface will not disarrange the ware.

Figure 16:
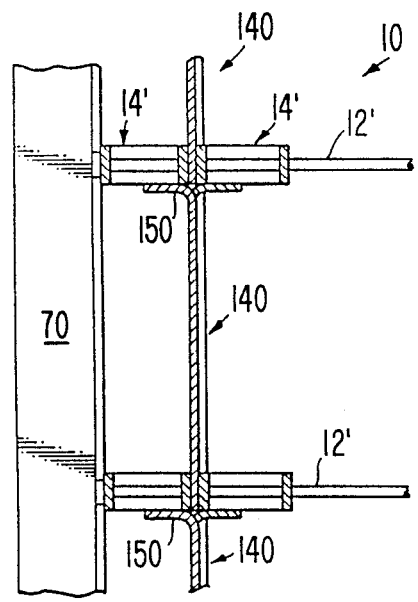
FIG. 16 is a schematic vertical sectional view illustrating the inside edge of a pair of stacked tiers of a conveyor belt with the support links disposed along this inside edge of the belt.
Figure 17:
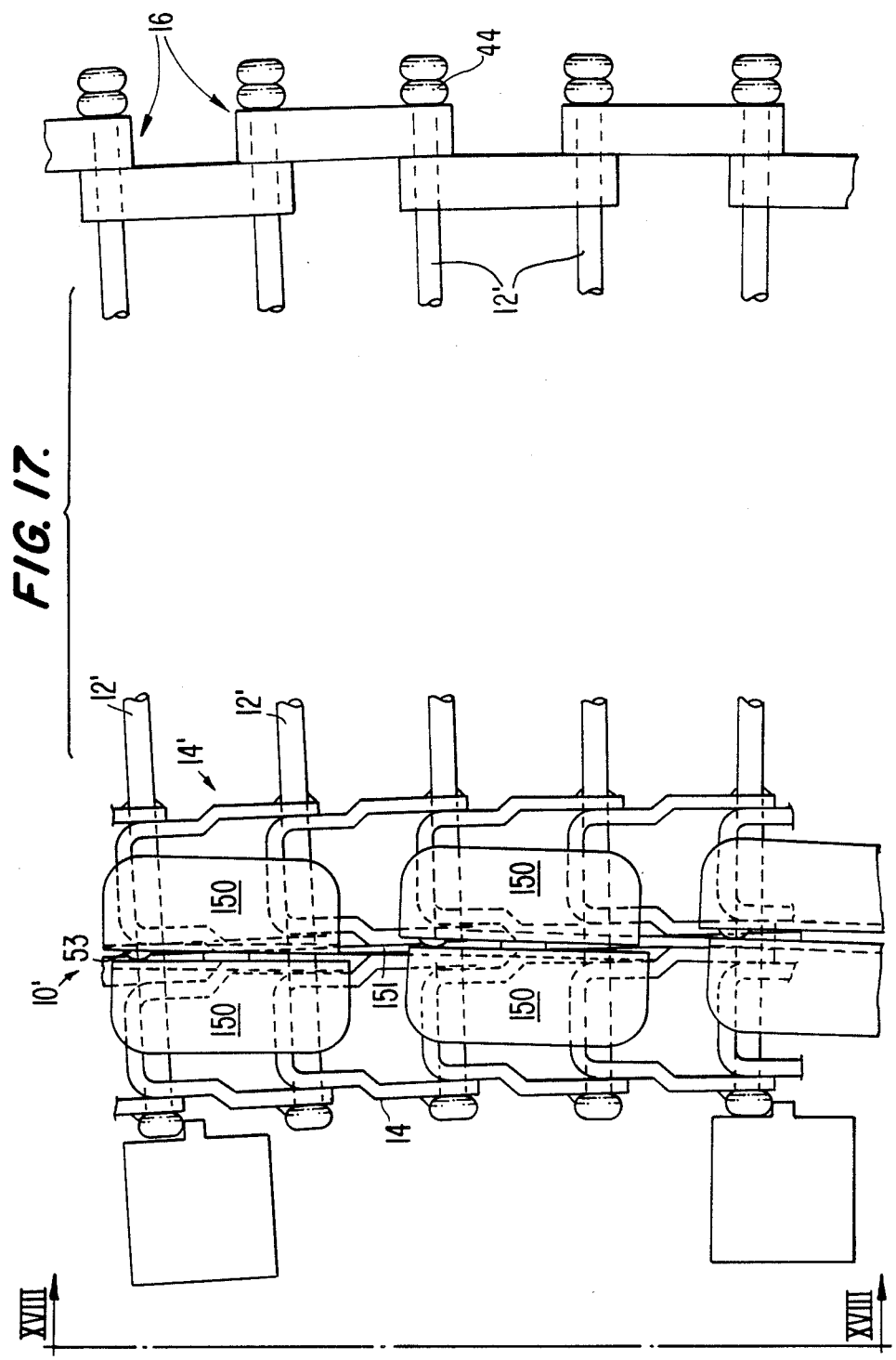
FIG. 17 is a top plan view of portions of the conveyor belt.
Figure 18:
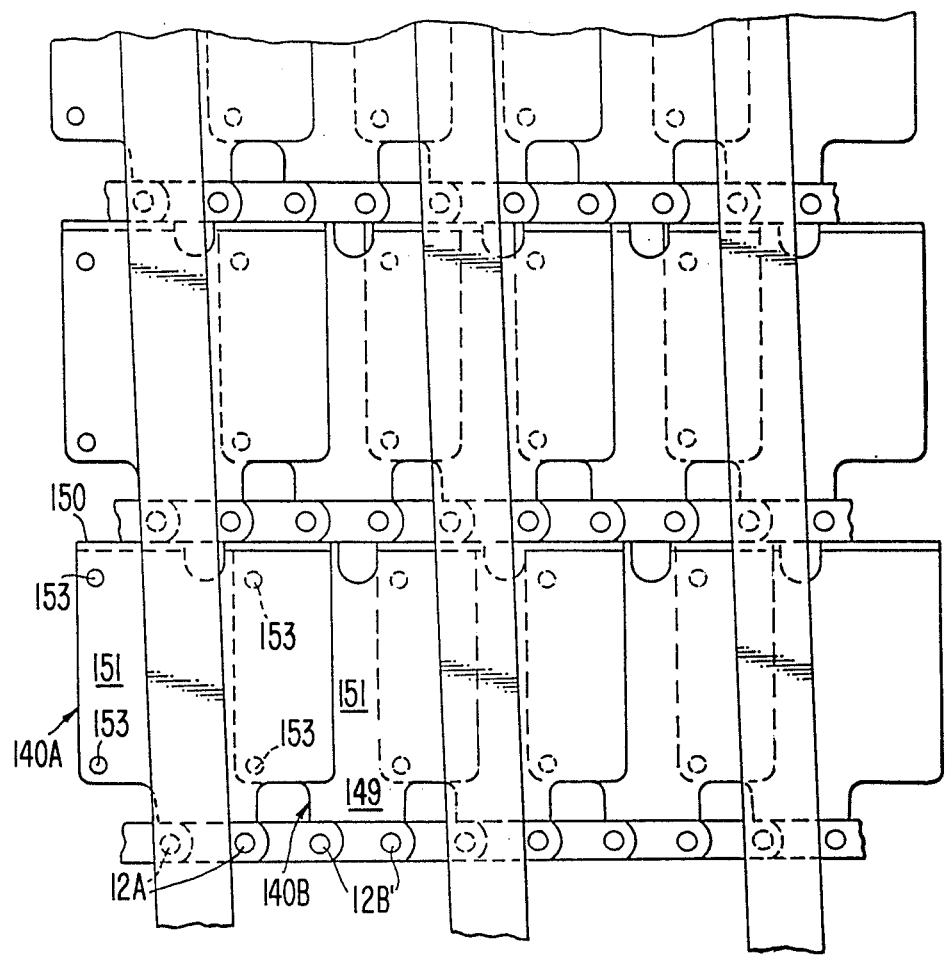
FIG. 18 is a side view taken generally along line XVIII—XVIII of FIG. 17.

FIGS. 16, 17, and 18 illustrate an embodiment of the invention wherein the conveyor belt 10' is used in a conveying system in which belt 10' travels along a helical path comprised of a number of superimposed helically extending tiers. FIG. 17 also illustrates the combination of a support link with dual pitch links. The conveyor belt of this embodiment will be designated 10', with elements of belt 10' which are similar to belt 10 indicated by like primed numerals.

Figure 13:
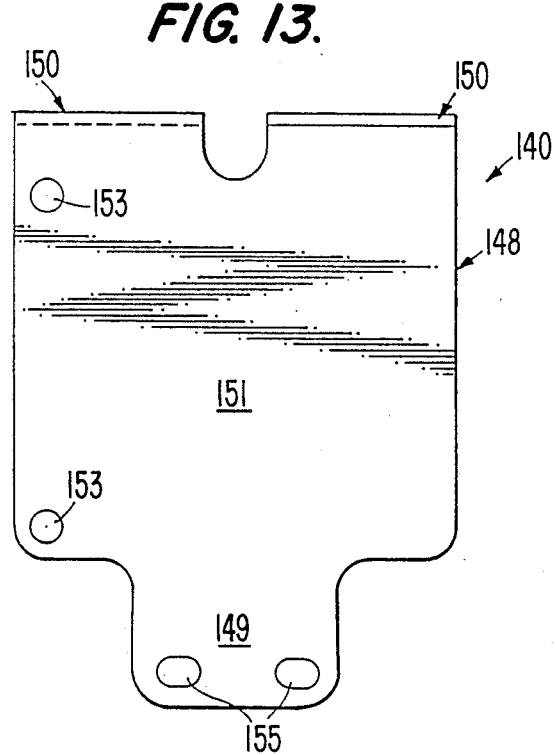
FIG. 13 is a side view of a support link in accordance with an embodiment of the present invention.
Figure 14:
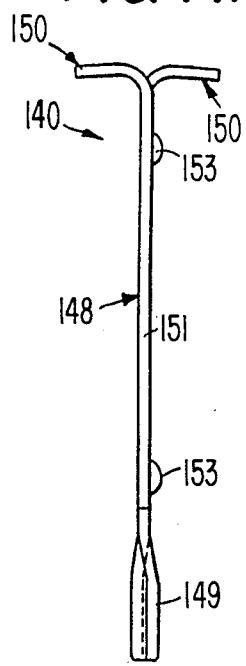
FIG. 14 is a front edge view of the support link illustrated in FIG. 13.
Figure 15:
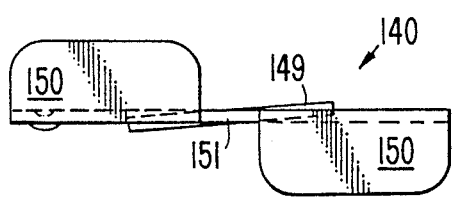
FIG. 15 is a top plan view of the support link illustrated in FIG. 13.

FIGS. 13, 14 and 15 illustrate details of an inside support link 140 used with belt 10'. Support links 140 can include a longitudinal portion 148 and tab portions 150. Longitudinal portion 148 is formed in two sections, i.e., a lower section 149 and an upper section 151. Lower section 149 contains a pair of holes 155 for receiving ends of adjacent rods 12' and tab portions 150 extend in opposite transverse directions from an upper end of upper section 151. Upper section 151 extends both upward and longitudinally in two directions from lower section 149. As best seen in FIG. 18, a first support link 140A is coupled to a first pair of adjacent rods 12A', while the next support link 140B is coupled to the next separate pair of adjacent rods 12B'. Lower sections 149 are held in alignment with the direction of travel of belt 10' by outer or end sections 146 of U-shaped links 14'. Upper sections 151 of support links 140 are angularly offset by approximately four degrees from the respective lower sections 149 in order to allow the longitudinal ends of adjacent longitudinal portions 148 to overlap. One end of longitudinal portions 148 include dimples 153 which keep the overlapping portions of adjacent support links 140 out of contact to permit cleaning.

Each tab portion 150 has a width which is sufficient to contact and support links 14' disposed in a tier above it. Also, the length of each tab portion 150 is set so that belt 10' can proceed around reverse bends without adjacent tab portions 150 coming into contact with one another.

As seen in FIG. 16, as the belt proceeds around a helical path, the inside edge of belt 10' is supported on a rotating base (not shown) and successive tiers of the helical path created by belt 10' are supported one upon another by means of support links 140. To accomplish this self-supporting feature, the vertical distance which tab portions 150 are located above rods 12' is selected to accommodate the particular helical path and the ware to be supported on belt 10'. Belt 10' is driven by an internal rotating cage which includes a plurality of vertically extending driving members 70.

Conveyor belt 10 with single pitch links 14 and dual pitch links 16 can be used in a conveying system embodiment wherein belt 10 will travel about lateral curves in a single direction and the lateral curves have a predetermined maximum curvature, i.e., the radius of curvature of the tightest lateral curve in the system will not be below a predetermined value. Single pitch links 14 and dual pitch links 16 will have predetermined spacing between the forwardmost and rearwardmost surfaces of the holes or slots in the links which are correlated to the predetermined maximum curvature of the belt travel and to one another. This correlation of spacing is set to assure that the portions of rods 12 along the inside edge of the belt remain at substantially the first pitch, and that at least one of the single pitch links 14, 14' continues to bear a tractive load while the belt proceeds around lateral curves up to the predetermined maximum curvature.

Conveyor belt 10 is driven along its inside edge in a conventional manner by a drive sprocket or drive cage engaging the inside edge of the belt. As the belt travels in a straight line direction, the tractive load is normally shared by all the single pitch links 14, and the inside ends of the rods are kept at the first pitch. The use of at least two inside U-shaped links helps assure that rods 12 extend substantially parallel during straight line motion under tractive load.

As belt 10 travels about a lateral curve, the outside ends of rods 12 expand in the pitch changing slots 22 of the dual pitch links 16. The rod actually expands from the slot first pitch area 28 to the second pitch area 36. Also, the tractive load gradually shifts to one of the two single pitch links which is farthest from the inside edge of the belt. Single pitch links 14 have a first predetermined spacing between the forwardmost and rearwardmost end surfaces of their holes 125 and 124. Dual pitch links 16 have a second, greater predetermined spacing between the rearwardmost end surfaces 21 of their pivot apertures 20 and the forwardmost surfaces 37 of their elongate pitch changing slot second pitch areas 36. The first and second predetermined spacings are correlated to one another and to the predetermined maximum curvature of the belt so that dual pitch links 16 assume only a minimal amount of the tractive load during travel about a lateral curve of the predetermined maximum curvature. Preferably, this predetermined spacing results in rods 12 contacting a forwardmost end surface 37 of the second pitch area 36 in the dual pitch links 16 without assuming any measurable tractive load so that single pitch links 14 continue to assume substantially all the tractive load. This condition is particularly desirable because then dual pitch links 16 will allow only a negligible amount of play between links 16 and the bearing surfaces of rods 12, thereby assuring smoothness of operation, while also insuring that the single pitch links 14 remain tractive and the inside edge of the belt does not collapse. This is accomplished by setting the ratio of the spacing ($P_o'$) of the pivot apertures 20 and elongate slots 22 second pitch areas 36 in the dual pitch links 16 to the distance ($R_o$) from the center of the radius of curvature of the belt to the outermost dual pitch links in the tightest curve only slightly greater than the ratio of the spacing ($P_i$) of the holes 124, 125 in the single pitch links 14 to the distance ($R_i$) from the center of the radius of curvature of the belt to the outermost leg 120 of single pitch links 14. Using the equation:

$$R_o \times P_i = P_o;$$

then $R_i$ $P_o' = P_o + 0.005$ to 0.010 inches. For example, in a system with a four and a half (4½)foot radius drive cage, two one-inch inside links, and a three (3) foot wide belt: $R_i = 56$ inches; $R_o = 90$ inches; $P_i = 1.080$ inches; and $P_o = 1.735$ inches; then $P_o' = 1.740$ to 1.745 inches. In such a belt, where the tractive load in the helical path could typically be 200 pounds, the single pitch links would continue to assume 150 to 200 pounds of the tractive load in lateral curves of the predetermined maximum curvature.

Figure 19:
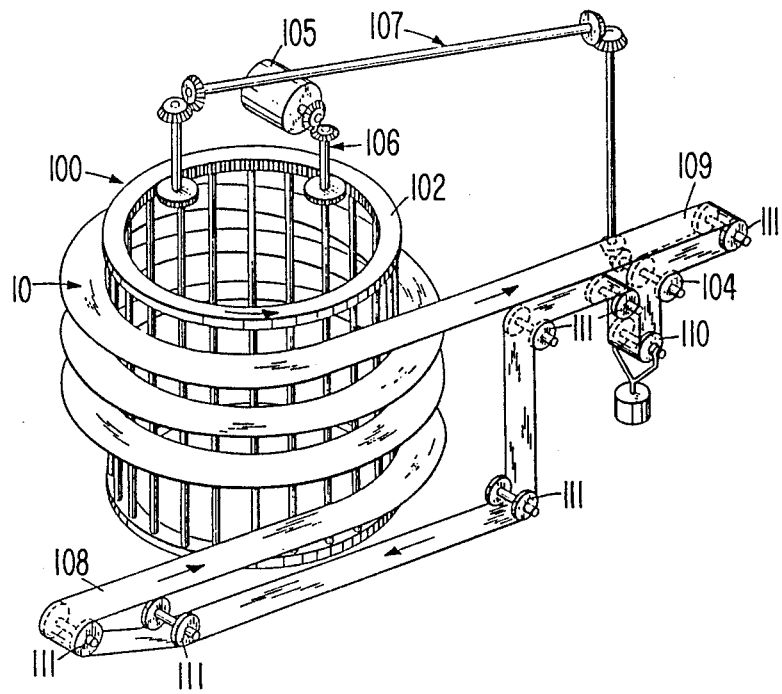
FIG. 19 is a schematic drawing of a conveyor system in accordance with the present invention wherein the belt conveys about a helical path and is driven by a frictional drive mechanism.

Referring now to FIG. 19 a spiral low tension helical tier conveying system 100 of the type shown in U.S. Pat. Nos. 4,078,655 and 3,348,659 is illustrated. System 100 can incorporate either of the belts 10 or 10' of the present invention. Since the low tension system is fully described in these patents, which are herein incorporated by reference, only a brief description will be given here. In such a low tension system 100, a cage type driving drum 102 frictionally engages the inner edge of belt 10 (or 10') to drive it with relatively low tension through a helical path around the drum. In addition, a positive sprocket drive 104 engages the belt 10 along a straight portion thereof. A motor 105 drives the drum 102 through gearing 106 and also drives the positive sprocket drive 104 through interconnected gearing 107. The belt 10 travels from the sprocket drive 104, past weighted tension take up roller 110 and idler pulleys 111 to a straight loading portion 108, then in helical loops around the drum 102 to a straight discharge portion 109 and around another idler 111 back to the drive sprocket.

Figure 20:
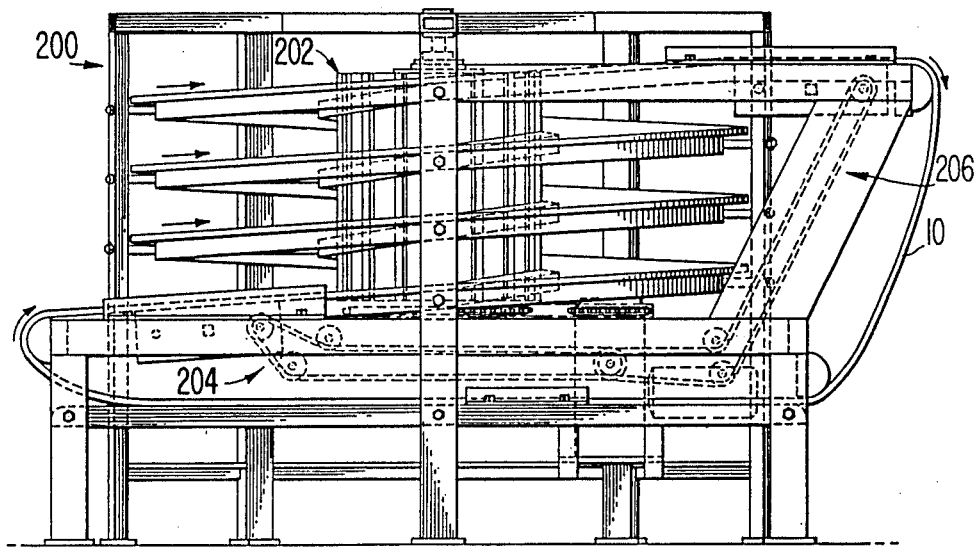
FIG. 20 is a schematic drawing of another embodiment of a conveyor system in accordance with the present invention wherein the conveyor belt conveys about a helical path and is driven by a positive drive mechanism.

Referring now to FIG. 20 a spiral very low tension helical tier conveying system 200 of the type shown in U.S. Pat. No. 4,741,430, issued on May 3, 1988 to Gerald C. Roinestad is illustrated. System 200 can incorporate either of the belts 10 or 10' of the present invention. Since the very low tension system is fully described in that patent application, which is herein incorporated by reference, only a brief description will be given here. In such a system 200, a cage type driving drum 202 positively engages the inner edge of belt 10 (or 10') to drive it with very low tension through a helical path around the drum. Driving drum 202 functions as the primary drive for the belt moving in the helical path. Secondary drives 204 and 206 are provided adjacent the inlet and outlet of the helical path, however, to maintain a desired fixed length of the belt in the helical path.

Belts 10 and 10' are particularly suited for use in helical tier systems 100 and 200. The maximum curvature of the system is located in the helical path and the spacing between the openings in single pitch links 14 and dual pitch links 16 (and support link 140, if used) is correlated to the radius of curvature of the helical path. This assures non-collapse of the inner edge of the belt within the helical path, while at the same time assuring smooth operation of the belt along its outer edge.

FIG. 21 illustrates an embodiment of the present invention wherein a conveyor system uses dual pitch links 16 disposed along both sides of the belt in order to allow the belt to travel in both the left and right directions as shown by arrows E and F. In such motion, the dual pitch links on the inside edge of the curve would remain at the first pitch position, while the dual pitch links 16 along the outside edge of the curve would be pivoted to the second, greater pitch orientation. FIG. 21 also illustrates belt 10 as part of a conveying system with a conventional conveyor drive mechanism 46, such as a sprocket drive, for moving the conveyor belt 12.

A mesh overlay 48 placed around rods 12 is also illustrated in FIG. 21. Mesh overlay 48 can be of any conventional design, such as wire formed into flattened helicals. The overlay is used to provide support for relatively easily damaged ware. The overlay can be manufactured to a width somewhat wider than its final assembled form on belt 10 so that it provides pressure in the transverse direction against both the inner and outer links to assure that they maintain their transverse position on rods 12, thereby eliminating the need for further welding or the use of mechanical devices to hold the links in place.

This invention has been described in detail in connection with the illustrated preferred embodiments. These embodiments, however, are merely for example only and the invention is not restricted thereto. It will be easily understood by those skilled in the art that other variations and modifications can be easily made within the scope of this invention, as defined by the appended claims.

We claim:

1. In a conveying system with a conveyor belt for conveying in both a straight line direction and around lateral curves and means for pivoting links between a first and a second position, the conveyor belt comprising:

a plurality of rods extending transversely of the length of the belt, having first and second transverse ends, said rods arranged adjacent one another longitudinally along the length of the belt; and means for connecting said rods to form a length of the belt including link means, disposed approximately adjacent said first and second transverse ends of said rods for coupling adjacent pairs of each of said rods to one another, for holding the first and second transverse ends of each of said rods at a substantially same first pitch during straight line motion of said belt, for holding the transverse ends of each of said rods located at the inside concave edge of a lateral curve to the first pitch during motion of the belt about the lateral curve, for moving, by cooperation with the pivoting means, the opposite transverse ends of each of said rods to a second greater pitch along the outside convex edge of the lateral curve as the belt moves from straight line to lateral curved motion, and for returning, by cooperation with the pivoting means, the opposite transverse ends of each of said rods to the first pitch as the belt moves from lateral curved to straight line motion.

2. A conveyor belt as in claim 1 for travel around lateral curves in a single direction, wherein said conveyor belt connecting means link means further comprises:
   a plurality of single pitch links disposed approximately along the inside edge of the belt having holes for receiving the first transverse ends of said rods during substantially all motion of the belt; and
   a plurality of dual pitch links disposed approximately along the outside edge of the belt, said dual pitch links being capable of pivoting motion between a first position and a second position, by cooperation with the pivoting means, with the second transverse ends of said rods being disposed at the first pitch in the first position of said dual pitch links and the second transverse ends of said rods being disposed at the second pitch in the second position of said dual pitch links.

3. A conveyor belt as in claim 2, wherein each of said dual pitch links include a body having a pivot aperture about which the dual pitch links can pivot and a pitch changing slot, the second transverse end of one of said rods being received in said pivot aperture and the second transverse end of an adjacent one of said rods being slidably received in said pitch changing slot, said pitch changing slot having a first pitch area where the second transverse end of said adjacent one of said rods is received when the rods are spaced by the first pitch and a second pitch area where the second transverse end of said adjacent one of said rods is received when the rods are spaced by the second pitch.

4. A conveyor belt as in claim 3, wherein each of said dual pitch link bodies are formed of a material having at least two thicknesses with the greater thickness material located about a substantial portion of said pivot aperture and said pitch changing slot.

5. A conveyor belt as in claim 4, wherein said body material is a molded plastic.

6. A conveying system as in claim 2, wherein said means for pivoting includes a cam surface for engaging said dual pitch links.

7. A conveying system as in claim 2, further comprising means for guiding the second transverse ends of each of said rods in the plane of travel of said belt during pivoting motion of said dual pitch links.

8. A conveyor belt as in claim 2, wherein said plurlity of single pitch links further comprise a general U-shape, at least two generally U-shaped single pitch links join adjacent pairs of said rods, each of said U-shaped links have a pair of spaced leg portions extending generally in the lengthwise direction of the belt and a connecting portion joining said spaced leg portions, and each of said leg portions have said single pitch link holes formed through them for receiving inside ends of a pair of said rods.

9. A conveyor belt as in claim 8, wherein said leg portions of each of said U-shaped links are generally linear and each pair of said leg portions diverge from their respective connecting portions.

10. A conveyor belt as in claim 9, wherein said connecting portions of each of said U-shaped single pitch links have a work-hardened bearing surface.

11. A conveyor belt as in claim 2, wherein each of said plurality of single pitch links further comprise a substantially flat piece of metal formed into a general U-shape, each U-shaped single pitch link having:
   a pair of spaced leg portions joined by a connecting portion, each of said leg portions having said single pitch link holes formed through them for receiving inside ends of a pair of adjacent rods; and
   a first thickness area and a second, reduced thickness area, both areas along the length of said connecting portion, said reduced thickness area being a compressed work-hardened area of said metal and said reduced thickness area in said connecting portion forming a curved bearing surface against which a rod can bear.

12. A conveying belt as in claim 11, wherein each of said generally U-shaped single pitch link connecting portion work-hardened second, reduced thickness areas are reduced to at least 90% of the first thickness at the point of maximum reduction.

13. A conveying belt as in claim 12, wherein said work-hardened area of each of said single pitch link connecting portions has a substantially flat outer surface opposite said curved bearing surface.

14. A conveying belt as in claim 11, wherein each of said curved bearing surfaces has a curvature approximately the same as the rod which bears against said curved bearing surface.

15. A conveying belt as in claim 11, wherein each of said generally U-shaped link members is formed as a single integral generally U-shaped link.

16. A conveying belt as in claim 11, wherein said work-hardened area of each of said single pitch link connecting portions has a substantially flat outer surface opposite said curved bearing surface.

17. A conveyor belt as in claim 1 for travel around curves in both right and left directions, wherein said conveyor belt link means further comprises dual pitch links disposed approximately along both edges of the belt, each of said dual pitch links being capable of pivoting motion between a first position and a second position, by cooperation with the pivoting means, wherein during straight line motion said dual pitch links along both edges of the belt are in the first position for holding the transverse ends of said rods connected by the respective dual pitch links at the first pitch, and during motion around a lateral curve said dual pitch links along the inside edge of the belt being capable of remaining in the first position to hold the transverse ends of said rods connected by the respective links at the first pitch and said dual pitch links along the outside edge of the belt being capable of pivoting motion between a first position and a second position with the opposite transverse ends of said rods being disposed at the second pitch in the second position of said dual pitch links.

18. A conveyor belt as in claim 17, wherein each of said dual pitch links includes a body having a pivot aperture about which the dual pitch links can pivot and a pitch changing slot, the transverse end of one of said rods being received in said pivot aperture and the transverse end of an adjacent one of said rods being slidably received in said pitch changing slot, said pitch changing slot having a first pitch area where the transverse end of said adjacent one of said rods is received when the rods are spaced by the first pitch and a second pitch area where the transverse end of said adjacent one of said rods is received when the rods are spaced by the second pitch.

19. A conveyor belt as in claim 18, wherein each of said dual pitch link bodies are formed of a material having at least two thicknesses with the greater thickness material located about a substantial portion of said pivot aperture and said pitch changing slot.

20. A conveyor belt as in claim 19, wherein said body material is a molded plastic.

21. A conveying system as in claim 17, wherein said means for pivoting includes a cam surface for engaging said dual pitch links.

22. A conveying system as claim 17, further comprising means for guiding the opposite transverse ends of each of said rods in the plane of travel of said belt during pivoting motion of said dual pitch links.

23. A conveying system comprising:
    means for moving a conveyor belt in a straight line direction and around lateral curves in at least one direction;
    a conveyor belt including:
        a plurality of rods extending transversely of the length of the belt, each rod having first and second transverse ends, said rods arranged adjacent one another longitudinally along the length of the belt; and
        a plurality of links connecting said rods to form the length of belt, said links disposed approximately adjacent said first and second transverse ends of said rods for coupling adjacent pairs of said rods to one another, said links holding the first and second transverse ends of said rods at a substantially same first pitch during straight line motion of said belt, and during motion of the belt about a lateral curve holding the transverse ends of said rods located at the inside edge of the lateral curve to the first pitch, moving the opposite transverse ends of said rods to a second greater pitch along the outside edge of the lateral curve as the belt moves from straight line to lateral curved motion and returning the opposite transverse ends of said rods to the first pitch as the belt moves from lateral curved to straight line motion, said links including dual pitch links disposed approximately along at least one transverse end of said belt, each of said dual pitch links including a body having a pivot aperture and a pitch changing slot, the transverse end of one of said rods received in said pivot aperture and the transverse end of an adjacent one of said rods being slidably received in said pitch changing slot, said pitch changing slot having a first pitch area where the transverse end of said adjacent one of said rods is received when the rods are spaced by said first pitch and a second pitch area where the transverse end of said adjacent one of said rods is received when the rods are spaced by said second pitch; and
    means for pivoting said dual pitch links between their first and second positions when said belt is driven past said pivoting means.

24. A conveying system as in claim 23, further comprising means for guiding the opposite transverse ends of each of said rods in the plane of travel of said belt during pivoting motion of said dual pitch links.

25. In a conveying system with a conveyor belt for conveying in both a straight line direction and around lateral curves in a single direction, and means for pivoting dual pitch links between a first and a second position, the conveyor belt comprising:
    a plurality of rods extending transversely of the length of the belt, each rod having an inside end along the inside edge of the lateral curves and an outside end along the outside edge of the lateral curves, said rods arranged adjacent one another longitudinally along the length of the belt; and
    means for connecting said rods to form a length of the belt including single pitch and dual pitch link means disposed approximately adjacent said inside and outside ends of said rods for coupling adjacent pairs of said rods to one another;
    said single pitch link means including:
        a plurality of single pitch links disposed approximately along the inside edge of the belt having holes for receiving the inside ends of said rods, said single pitch links hold the inside ends at the first pitch during substantially all motion of the belt; and
        at least one support link disposed approximately adjacent said single pitch links and coupled substantially between adjacent pairs of said rods, said support links having tab portions spaced a predetermined distance from said rods to contact and support an inside edge of an adjacent vertically spaced tier of said belt; and
    said dual pitch link means including a plurality of dual pitch links disposed approximately along the outside edge of the belt, said dual pitch links being capable of pivoting motion between a first position and second position, by cooperation with the pivoting means, with the outside ends of said rods being held at the first pitch in the first position of said dual pitch links and the outside ends of said rods being held at the second pitch in the second position of said dual pitch links.

26. A conveyor belt as in claim 25, wherein each of said support links further comprise:
    a longitudinal portion extending both longitudinally between a pair of said adjacent rods and vertically away from said rods having holes formed in said longitudinal portion through which an adjacent pair of rods extend; and
    said tab portions extend transversely from said longitudinal portion.

27. A conveyor belt as in claim 26, wherein said plurality of single pitch links further comprise a general U-shape, at least two generally U-shaped single pitch links join adjacent pairs of said rods with one of said U-shaped links disposed on either side of a respective one of said support links, each of said U-shaped links have a pair of spaced leg portions extending generally in the lengthwise direction of the belt and a connecting portion joining said spaced leg portions, and each of said leg portions have said single pitch link holes formed through them for receiving said inside ends of a pair of said rods.

28. A conveyor belt as in claim 27, wherein said spaced leg portions of each of said U-shaped links have end sections adjacent to the longitudinal portions of said support links, and said end sections extend substantially perpendicular to the transverse extent of said rods to align said support links with respect to said rods.

29. A conveyor belt as in claim 28, wherein said longitudinal portion of each of said support links has a lower section with said holes for coupling to said rods and an upper section extending vertically and longitudinally from the lower section, said upper section being angularly offset from the lower section and having a longitudinal dimension such that the upper sections of adjacent support links substantially overlap one another.

30. A conveyor belt as in claim 26, wherein said longitudinal portion of each of said support links has a lower section with said holes for coupling to said rods and an upper section extending vertically and longitudinally from the lower section, said upper section being angularly offset from the lower section and having a longitudinal dimension such that the upper sections of adjacent support links substantially overlap one another.

31. In a conveying system with a conveyor belt for conveying in both a straight line direction and around lateral curves in a single direction, the lateral curves having a predetermined maximum curvature with a predetermined radius of curvature, and with means for pivoting dual pitch links between a first and a second position, the conveyor belt comprising:

a plurality of rods extending transversely of the length of the belt, each rod having an inside end along an inside edge of the lateral curves and an outside end along an outside edge of the lateral curves, said rods arranged adjacent one another longitudinally along the length of the belt; and means for connecting said rods to form a length of the belt, including single pitch and dual pitch link means disposed approximately adjacent the inside and outside ends of said rods for coupling adjacent pairs of said rods to one another, said single pitch and dual pitch link means keeping the inside and outside ends of said rods at substantially the same first pitch during straight line motion of said belt and, during motion of the belt about said lateral curves, said single pitch and dual pitch link means keeping said inside ends of said rods at substantially the first pitch and allowing said outside ends of said rods to move to a second greater pitch as the belt moves from straight line to lateral curved motion and to return to said first pitch as the belt moves from lateral curved to straight line motion;

said single pitch link means including, along the inside edge of the belt, a plurality of single pitch links with at least two single pitch links joining each pair of adjacent rods, each of said single pitch links having holes, each of said holes having end surfaces spaced a predetermined distance from each other so that a plurality of said single pitch links joining adjacent rods align the adjacent rods in generally parallel relationship at the first pitch when the belt is placed under tractive load in straight line conveying motion; and said dual pitch link means including, along the outside edge of the belt, a plurality of dual pitch links with at least one dual pitch link joining each pair of adjacent rods, each of said dual pitch links having a pivot aperture about which the dual pitch links can pivot, by cooperation with the pivoting means, and a pitch changing slot through which said rods extend with said pitch changing slot allowing the outside ends of said rods to move between the first and second pitches.

32. A conveyor belt as in claim 31, wherein the outside end of one of said rods is received in said pivot aperture and the outside end of an adjacent one of said rods is slidably received in said pitch changing slot, said pitch changing slot having a first pitch area where the outside end of said adjacent one of said rods is received when the rods are spaced by said first pitch and a second pitch area where the outside end of said adjacent one of said rods is received when the rods are spaced by said second pitch.

33. A conveyor belt as in claim 32, wherein said pivot aperture and said pitch changing slot second pitch area in said dual pitch links each have an end surface with a predetermined longitudinal distance between said pivot aperture and said pitch changing slot second pitch area end surfaces, said single pitch link hole end surface predetermined distance and said dual pitch link pivot aperture and pitch changing slot second pitch area end surface predetermined distance are correlated to one another and to the predetermined radius of curvature so that in straight line conveying motion the inside ends of said rods are kept at the first pitch and the single pitch links are tractive and during lateral curved conveying motion the inside ends of said rods are kept at substantially the first pitch and at least one of said single pitch links joining each adjacent pair of rods remains tractive while the outside ends of said rods move to a second greater pitch.

34. A conveyor belt as in claim 33, wherein the correlation between the longitudinally spaced end surfaces of said holes in said single pitch links and the end surfaces of said pivot apertures and said pitch changing slot second pitch areas in said dual pitch links causes the outside ends of said rods to contact the opposing end surfaces in said pivot apertures and said pitch changing slot second pitch areas of said dual pitch links when the belt travels about a lateral curve of the predetermined maximum curvature with the dual pitch links assuming a minimal amount of tractive load to assure that at least one of said plurality of said single pitch links joining each pair of adjacent rods remains tractive and the inside ends of said rods remain at substantially the first pitch.

35. A conveyor belt as in claim 34, wherein the ratio of the predetermined spacing between the pivot aperture and pitch changing slot second pitch area end surfaces of said dual pitch links to the distance from the center of the predetermined radius of curvature to the outermost dual pitch links is only slightly greater than the ratio of the predetermined spacing between the holes in said single pitch links to the distance from the center of the predetermined radius of curvature to the outermost of said single pitch links.

36. In a conveying system with a conveyor belt for conveying in both a straight line direction and around lateral curves in a single direction, the lateral curves having a predetermined maximum curvature with a predetermined radius of curvature, and with means for pivoting dual pitch links between a first and a second position, the conveyor belt comprising:

a plurality of rods extending transversely of the length of the belt, each rod having an inside end along the inside edge of the lateral curves and an outside end along the outside edge of the lateral curves, said rods arranged adjacent one another longitudinally along the length of the belt; and means for connecting said rods to form a length of the belt, including single pitch and dual pitch links means disposed approximately adjacent said inside and outside ends of said rods for coupling adjacent pairs of said rods to one another;

said single pitch link means including, along the inside edge of the belt, a plurality of single pitch links with at least two generally U-shaped links joining the inside ends of each pair of adjacent rods, each of said generally U-shaped links having a pair of spaced leg portions joined by a connecting portion, each of said leg portions having holes for receiving said rods, each of said holes in the legs of said U-shaped links having an end surface with a first predetermined longitudinal spacing between said hole end surfaces; and said dual pitch link means including, approximately along the outside edge of the belt, a plurality of dual pitch links with at least one dual pitch link joining the outside ends of each pair of adjacent rods, each of said dual pitch links having a pivot aperture about which the dual pitch links can pivot, by cooperation with the pivoting means, and a pitch changing slot, the outside end of one of said rods is received in said pivot aperture and the outside end of an adjacent one of said rods is slidably received in said pitch changing slot, said pitch changing slot includes a first pitch area where the outside end of said adjacent one of said rods is received when the rods are spaced by said first pitch and a second pitch area where the outside end of said adjacent one of said rods is received when the rods are spaced by said second pitch, said pivot aperture and pitch changing slot second pitch area each have an end surface with a second predetermined longitudinal spacing between said pivot aperture and said pitch changing slot second pitch area end surfaces, said first and second longitudinal spacings being correlated to one another and to the predetermined radius of curvature so that in straight line conveying motion the inside ends of said rods are kept at a first pitch and U-shaped links are tractive, and during lateral curved conveying motion the inside ends of said rods are kept a substantially the first pitch and at least one of the U-shaped links remains tractive while the outside ends of said rods move to a second greater pitch.

37. A conveyor belt as in claim 36, wherein the correlation between the longitudinal spacing of the end surfaces of said holes in said U-shaped links and the end surfaces of said pivot apertures and said pivot changing slot second pitch areas in said dual pitch links causes the outside ends of said rods to contact the opposing end surfaces in said pivot apertures and said pitch changing slot second pitch areas of said dual pitch links when the belt travels about a lateral curve of the predetermined maximum curvature with the dual pitch links assuming a minimal amount of tractive load to assure that at least one of said U-shaped links remains tractive and the inside ends of said rods remain at substantially the first pitch.

38. A conveyor belt as in claim 37, wherein the ratio of the second predetermined spacing between said pivot aperture and said pitch changing slot second pitch area end surfaces of said dual pitch links to the distance from the center of the predetermined radius of curvature to the outermost dual pitch links is only slightly greater than the ratio of the first predetermined spacing between the holes in said U-shaped links to the distance from the center of the predetermined radius of curvature to the outermost leg of said U-shaped links.

39. In a conveying system with a conveyor belt for conveying in both a straight line direction and around lateral curves in a single direction, the lateral curves including a helical path and having a predetermined maximum curvature with a predetermined radius of curvature in the helical path, and with means for pivoting dual pitch links between a first and second position, the belt comprising:

a plurality of rods extending transversely of the length of the belt, each rod having an inside end along the inside edge of the lateral curves and an outside end along the outside edge of the lateral curves, said rods arranged adjacent one another longitudinally along the length of the belt; and means for connecting said rods to form a length of the belt including single pitch and dual pitch link means disposed approximately adjacent said inside and outside ends of said rods for coupling adjacent pairs of said rods to one another;

said single pitch link means including:

a plurality of single pitch links with at least two generally U-shaped single pitch links joining adjacent pairs of said rods, each of said U-shaped links having a pair of spaced leg portions connected by a connecting portion, each of said leg portions having holes for receiving adjacent ones of said rods, each of said holes having an end surface with a first predetermined longitudinal spacing between said hole end surfaces; and at least one support link disposed approximately along the inside edge of said belt having:

a longitudinal portion extending both longitudinally between a pair of said adjacent rods and vertically away from said rods and having holes for receiving adjacent ones of said rods; and at least one tab portion extending transversely from said longitudinal portion, said tab portion being spaced a predetermined vertical distance from said rods to contact and support an inside edge of an adjacent vertically spaced tier of said belt when said belt travels along a helical path; and said dual pitch link means including a plurality of dual pitch links with at least one dual pitch link disposed approximately along the outside edge of the belt and having a pivot aperture about which the dual pitch links can pivot, by cooperation with the pivoting means, and a pitch changing slot, the outside end of one of said rods is received in said pivot aperture and the outside end of an adjacent one of said rods is slidably received in said pitch changing slot, said pitch changing slot includes a first pitch area where the outside end of said adjacent one of said rods is received when the rods are spaced by said first pitch and a second pitch area where the outside end of said adjacent one of said rods is received when the rods are spaced by said second pitch, said pivot aperture and pitch changing slot second pitch area in said dual links each have an end surface with a second predetermined longitudinal spacing between said pivot aperture and said pitch changing slot second pitch area end surfaces, said first and second longitudinal spacings being correlated to one another and to the predetermined radius of curvature so that in straight line conveying motion the inside ends of said rods are kept at a first pitch and the U-shaped links are tractive, and during lateral curved conveying motion the inside ends of said rods are kept at substantially the first pitch and at least one of the U-shaped links remains tractive while the outside ends of the rods move to a second greater pitch.

40. A conveyor belt as in claim 39, wherein the correlation between the longitudinally spaced end surfaces of said holes in said U-shaped links and the end surfaces of said pivot apertures and said pitch changing slot second pitch areas in said dual pitch links causes the outside ends of said rods to contact the opposing end surfaces in the pivot aperture and pitch changing slot second pitch area of said dual pitch links when the belt travels about a lateral curve of the predetermined maximum curvature with the dual pitch links assuming a minimal amount of tractive load to assure at least one of said U-shaped links remain tractive and the inside ends of said rods remain at substantially the first pitch.

41. A conveyor belt as in claim 40, wherein the ratio of the second predetermined spacing between said pivot aperture and said pitch changing slot second pitch area end surfaces of said dual pitch links to the distance from the center of the predetermined radius of curvature to the outermost dual pitch links is only slightly greater than the ratio of the first predetermined spacing between the holes in the leg portions of said U-shaped links to the distance from the center of the predetermined radius of curvature to the outermost leg of said U-shaped links.

42. A conveying system orienting a conveyor belt in both a straight line direction and around lateral curves in a single direction, the lateral curves including a helical portion forming a plurality of tiers of the belt and having a predetermined maximum curvature with a predetermined radius of curvature in the helical portion, the system comprising:

means for moving a belt along a conveying path;
a conveyor belt including:
    a plurality of rods extending transversely of the length of the belt, each rod having an inside end along the inside edge of the lateral curves and an outside end along the outside edge of the lateral curves, said rods arranged adjacent one another longitudinally along the length of the belt; and
    means for connecting said rods to form a length of the belt including single pitch and dual pitch link means disposed approximately adjacent said inside and outside ends of said rods for coupling adjacent pairs of said rods to one another, said single pitch and dual pitch link means keeping the inside and outside ends of said rods at substantially the same first pitch during straight line motion of said belt and, during motion of the belt about lateral curves, said single pitch and dual pitch link means keeping said inside ends of said rods at said first pitch and allowing said outside ends of said rods to move to a second greater pitch as the belt moves from straight line to lateral curved motion and to return to said first pitch as the belt moves from lateral curved to straight line motion;
    said single pitch link means including, along the inside edge of the belt, a plurality of single pitch links with at least two single pitch links joining each pair of adjacent rods, each of said single pitch links having holes, each of said holes having end surfaces spaced a predetermined distance from each other so that said plurality of said single pitch links joining adjacent rods align the adjacent rods in a generally parallel relationship at said first pitch when said belt is placed under tractive load in straight line conveying motion; and
    said dual pitch link means inlcuding, along the outside edge of the belt, at least one dual pitch link means joining each pair of adjacent rods, each of said dual pitch links having a pivot aperture, about which the dual pitch links can pivot, and a pitch changing slot through which said rods extend with said pitch changing slot allowing the outside ends of said rods to move between the first and second pitches; and
    means for pivoting said dual pitch links between first and second positions when said belt is driven past said pivoting means.

43. A conveying system as in claim 42, wherein the outside end of one of said rods is received in said pivot aperture and the outside end of an adjacent one of said rods is slidably received in said pitch changing slot, said pitch changing slot having a first pitch area where the outside end of said adjacent one of said rods is received when the rods are spaced by said first pitch and a second pitch area where the outside end of said adjacent one of said rods is received when the rods are spaced by said second pitch.

44. A conveying system as in claim 43, wherein said pivot aperture and pitch changing slot in said dual pitch links each have an end surface with a predetermined longitudinal distance between said pivot aperture and said pitch changing slot second pitch area end surfaces, said single pitch link hole end surface predetermined distance and said dual pitch link pivot aperture and pith changing slot second pitch area end surface predetermined distance are correlated to one another and to the predetermined radius of curvatures so that in straight line conveying motion the inside ends of said rods are kept at the first pitch and the single pitch links are tractive, and during lateral curved conveying motion the inside ends of said rods are kept at substantially the first pitch and at least one of said single pitch links joining each adjacent pair of rods remains tractive while the outside ends of said rods move to a second greater pitch.

45. A conveying system as in claim 44, wherein the correlation between the longitudinally spaced end surfaces of said holes in said single pitch links and the end surfaces of said pivot apertures and said pitch changing slot second pitch areas in said dual pitch links causes the outside ends of said rods to contact the opposing end surfaces in the pivot apertures and pitch changing slot second pitch areas of said dual pitch links when the belt travels about a lateral curve of the predetermined maximum curvature with the dual pitch links assuming a minimal amount of tractive load to assure that at least one of said single pitch links remains tractive and the inside ends of said rods remain at substantially the first pitch.

46. A conveying system as in claim 45, wherein the ratio of the predetermined spacing between said pivot aperture and said pitch changing slot second pitch area end surfaces of said dual pitch links to the distance from the center of the said predetermined radius of curvature to the outermost dual pitch links is only slightly greater than the ratio of the predetermined spacing between the holes in said single pitch links to the distance from the center of the predetermined radius of curvature to the outermost single pitch links.

47. A conveying system as in claim 42, wherein said drive means includes a rotating driving member frictionally engaging the inside edge of the belt in the helical portion.

48. A conveying system as in claim 42, wherein said drive means includes a rotating driving member positively engaging the inside edge of the belt in the helical portion.

49. A conveying system orientating the belt in both a straight line direction and around lateral curves in a single direction, the lateral curves including a helical portion forming a plurality of tiers of the belt, and having a predetermined maximum curvature with a predetermined radius of curvature in the helical portion, the system comprising:

means for moving a belt along a conveying path;
a conveyor belt including:
a plurality of rods extending transversely of the length of the belt, each rod having an inside end along the inside edge of the lateral curves and an outside end along the outside edge of the lateral curves, said rods arranged adjacent one another longitudinally along the length of the belt; and
means for connecting said rods to form a length of the belt including single pitch and dual pitch link means disposed approximately adjacent said inside and outside ends of said rods for coupling adjacent pairs of said rods to one another;
said single pitch link means including, along the inside concave edge of the belt, a plurality of single pitch links with at least two generally U-shaped links joining the inside ends of each pair of adjacent rods, each of said generally U-shaped links having a pair of spaced leg portions joined by a connecting portion, each of said leg portions having holes for receiving said rods, each of said holes in the legs of said U-shaped links having an end surface with a first predetermined longitudinal spacing between said hole end surfaces; and
said dual pitch link means including along the outside edge of the belt, a plurality of dual pitch links with at least one dual pitch link joining the outside ends of each pair of adjacent rods, each of said dual pitch links having a pivot aperture about which the dual pitch links can pivot and a pitch changing slot, the outside end of one of said rods is received in said pivot aperture and the outside end of an adjacent one of said rods is slidably received in said pitch changing slot, said pitch changing slot includes a first pitch area where the outside end of said adjacent one of said rods is received when the rods are spaced by said first pitch and a second pitch area where the outside end of said adjacent one of said rods is received when the rods are spaced by said second pitch, said pivot aperture and pitching changing slot second pitch area each have an end surface with a second predetermined longitudinal spacing between said pivot aperture and said pitch changing slot second pitch area end surfaces, said first and second longitudinal spacings being correlated to one another and to the predetermined radius of curvature so that in straight line conveying motion the inside ends of said rods are kept at a first pitch and the U-shaped links are tractive, and during lateral curved conveying motion the inside ends of said rods are kept at substantially the first pitch and at least one of U-shaped links remains tractive while the outside ends of said rods move to a second greater pitch; and means for pivoting said dual pitch links between first and second positions when said belt is driven past said pivoting means.

50. A conveying system as in claim 49, wherein the correlation between the longitudinally spaced end surfaces of the holes in said U-shaped links and the pivot apertures and pitch changing slot second pitch areas in said dual pitch links causes the outside ends of said rods to contact the opposing end surfaces in the pivot apertures and pitch changing slot second pitch areas of said dual pitch links when the belt travels about a lateral curve of the predetermined maximum curvature with the dual pitch links assuming a minimal amount of tractive load to assure that at least one of said U-shaped links remains tractive and the inside ends of said rods remain at substantially the first pitch.

51. A conveying system as in claim 50, wherein the ratio of the second predetermined spacing between said pivot aperture and said pitch changing slot second pitch area end surfaces of said dual pitch links to the distance from the center of the predetermined radius of curvature to the outermost dual pitch links is only slightly greater than the ratio of the first predetermined spacing between the holes in the leg portions of said U-shaped links to the distance from the center of the predetermined radius of curvature to the outermost leg of said U-shaped links.

52. A conveying system as in claim 49, wherein said drive means includes a rotating driving member frictionally engaging the inside edge of the belt in the helical portion.

53. A conveying system as in claim 49, wherein said drive means includes a rotating driving member positively engaging the inside edge of the belt in the helical portion.

54. A conveying system orientating the belt in both a straight line direction and around lateral curves in a single direction, the lateral curves including a helical portion forming a plurality of stacked tiers of the belt and having a predetermined maximum curvature with a predetermined radius of curvature in the helical portion, the conveyor system comprising:

means for moving the belt along a conveying path;
a conveyor belt including:
a plurality of rods extending transversely of the length of the belt, each rod having an inside end along the inside edge of the lateral curves and an outside end along the outside edge of the lateral curves, said rods arranged adjacent one another logitudinally along the length of the belt; and
means for connecting said rods to form a length of the belt including single pitch and dual pitch link means disposed adjacent said inside and outside ends of said rods for coupling adjacent pairs of said rods to one another;
said single pitch link means including:
a plurality of generally U-shaped links with at least two generally U-shaped links connecting adjacent pairs of said rods, each of said generally U-shaped links having a pair of spaced leg portions connected by a connecting portion, each of said U-shaped link leg portions having holes for receiving adjacent ones of said rods, each of said holes formed in said U-shaped links having an end surface with a first predetermined longitudinal spacing between said hole end surfaces; and at least one support link disposed approximately along the inside edge of said belt having:
- a longitudinal portion extending both longitudinally between a pair of said adjacent rods and vertically away from said rods, said longitudinally portion of said support links having holes for receiving adjacent ones of said rods; and
- at least one tab portion extending transversely from said longitudinal portion, said tab portion being spaced a predetermined vertical distance from said rods to contact and support an inside edge of an adjacent vertically spaced tier of said belt when said belt travels along the helical portion;

said dual pitch link means including, along the outside edge of the belt, a plurality of dual pitch links with one dual pitch link joining the approximate outside ends of each pair of adjacent rods, each of said dual pitch links having a pivot aperture about which the dual pitch links can pivot and a pitch changing slot, wherein the outside end of one of said rods is received in said pivot aperture and the outside end of an adjacent one of said rods is slidably received in said pitch changing slot, said pitch changing slot includes a first pitch area where the outside end of said adjacent one of said rods is received when the rods are spaced by said first pitch and a second pitch area where the outside end of said adjacent one of said rods is received when the rods are spaced by said second pitch, said pivot aperture and pitch changing slot second pitch area each have an end surface with a second predetermined longitudinal spacing between said pivot aperture and pitch changing slot second pitch area end surfaces, said first and second longitudinal spacings being correlated to one another and to the predetermined radius of curvatures so that in straight line conveying motion the inside ends of said rods are kept at a first pitch and the U-shaped links are tractive, and during lateral curved conveying motion the inside ends of said rods are kept a substantially the first pitch and at least one of the U-shaped links remains tractive while the outside ends of the rods move to a second greater pitch; and means for pivoting said dual pitch links between first and second positions when said belt is driven past said pivoting means.

55. A conveying system as in claim 54, wherein the correlation between the longitudinal spacing of the end surfaces of said holes in said U-shaped links and the end surfaces of said pivot apertures and said pitch changing slot second pitch areas in said dual pitch links causes the outside ends of said rods to contact the opposing end surfaces in said pivot apertures and said pitch changing slot second pitch areas of said dual pitch links when the belt travels about a lateral curve of the predetermined maximum curvature with the dual pitch links assuming a minimal amount of tractive load to assure that at least one of said U-shaped links remains tractive and the inside ends of said rods remain at substantially the first pitch.

56. A conveyor system as in claim 55, wherein the ratio of the predetermined spacing between the pivot aperture and pitch changing slot second pitch area end surfaces of said dual pitch links to the distance from the center of the predetermined radius of curvature to the outermost dual pitch links is only slightly greater than the ratio of the predetermined spacing between the holes in the leg portions of said U-shaped links to the distance from the center of the predetermined radius of curvature to the outermost leg of said U-shaped links.

57. A conveying system as in claim 54, wherein said drive means includes a rotating driving member frictionally engaging the inside edge of said belt in the helical portion.

58. A conveying system as in claim 54, wherein said drive means includes a rotating driving member positively engaging the inside edge of said belt in the helical portion.

59. A conveying system as in claim 23, wherein said belt is arranged to travel around lateral curves that include a helical portion forming a plurality of tiers of the belt.

60. A conveying system as in claim 23, wherein said belt is arranged to travel around lateral curves in both directions and said dual pitch links are located adjacent both transverse ends of said rods.

* * * * *